United States Patent Office 3,421,844
Patented Jan. 14, 1969

3,421,844
METHOD OF PRODUCING HIGHLY PURE HALOGEN COMPOUNDS OF GALLIUM AND INDIUM
Ludwig Mögele, Erlangen, Germany, assignor to Siemens Aktiengesellschaft, Berlin, Germany, a corporation of Germany
No Drawing. Filed May 10, 1967, Ser. No. 637,337
Claims priority, application Germany, May 14, 1966, S 103,815
U.S. Cl. 23—87    6 Claims
Int. Cl. C01g *15/00*

ABSTRACT OF THE DISCLOSURE

Disclosed is method of producing highly-pure halogen compounds of gallium and indium of the general formula $$MeX_3$$

wherein Me is gallium or indium and X is bromide or iodine. The chlorides or bromides of trivalent gallium or trivalent indium are reacted with a halide compound of the general formula RX', wherein R is hydrogen or an alkyl radical of 1–5 C-atoms and X' is the same as X at a temperature between room temperature and the boiling temperature of the reaction mixture.

---

The present invention relates to a method for producing highly pure bromides and iodides of gallium and indium.

The bromide and iodide of gallium and indium could, up to now, be produced only according to a very expensive, three stage process. First, the metals had to be reacted with the halogens in elemental form at reaction temperatures between approximately 300 and 900° C., in a closed system. The reaction products formed had to be subsequently isolated, for example by distillation, to remove the excess halogen. Since, at the aforestated high reaction temperatures, by-products form, necessitating other complicated purifying operations in order to obtain relatively pure products, additional difficulties are encountered. For example, multiple vacuum distillations through repeated sublimation in special vacuum apparatus, become necessary.

The reactions, proceeding in a heterogeneous phase, were made even more complicated since in most cases, such as during the production of $GaI_3$, work had to be carried out in a closed vacuum system. This entailed the danger of explosion if permissible temperatures and pressures were not exactly maintained. A complete reaction of the elements was difficult to bring about due to the resulting gallium iodide crusts. As previously mentioned, purifying the reaction product, which is precipitated in compact form from the resulting by-products and from excess iodine, is extremely expensive if at all possible.

The yield therefore, it very small. Also, due to the present complicated production method, the output had to be limited to a small scale and the yield was in no way comparable to the expensive operating measures.

I have, surprisingly, discovered that highly pure halogen compounds of gallium and indium, of the general formula $MeX_3$, wherein Me=gallium or In and wherein X is a bromine or iodine, may be produced in a very simple manner by reacting the chlorides or bromides of the trivalent gallium or trivalent indium with a halogen compound of the general formula RX' wherein R represents a hydrogen atom or an alkyl radical with 1 to 5 C atoms and X' has the same meaning as X. The temperature range lies between room temperature and the boiling temperature of the reaction mixture.

My new method makes it possible to produce the iodides and bromides of the gallium and indium in a homogeneous one-step method with almost theoretical yields. Purification of the products thus produced is, in most cases, unnecessary and may be done, if necessary, by means of a single re-crystallization from aliphatic, aromatic or cycloaliphatic hydrocarbons, for example pentane, benzene or cyclohexane.

The reaction products resulting from my invention are small crystals by contrast to the old method, and are therefore, particularly suitable for further reaction and also easy to handle. They have sharp melting points. Within a very short period of time, large amounts of gallium and indium bromides as well as gallium and indium iodides may now be produced completely free of danger and in a highly purified form.

Preferably, the new method will use the reaction participants in stoichiometric amounts, according to the equation:

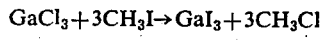

or

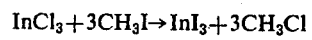

or according to the equation:

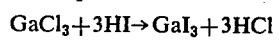

or

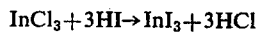

The method of the present invention may also be used by the reaction in the presence of a solvent which may be aliphatic, aromatic or cycloaliphatic hydrocarbons such as, for example, pentane, chlorated hydrocarbons, benzene, xylene and cyclohexane. I wish to point out that when aromatic solvents and alkyl halides are used, the solvent participates in the reaction process in accordance with the following equation:

The practical application of the new method is simple. The metal chloride, which may be dissolved in a hydrocarbon, is placed into a reaction flask which is equipped with a reflux condenser. A stoichiometric amount of alkyl-halides is added with agitation at room temperature. Anhydrous hydrogen halide may be introduced in lieu of the alkyl halide, also at room temperature. The reaction begins almost immediately with the formation of alkyl-chloride or hydrochloride, and proceeds at an adequate speed, with low heat development. The gallium (III) or indium (III) halide, precipitated during the reaction process in a finely crystalline form, is dried in the vacuum to eliminate the moisture.

It should further be noted that the method of the present invention is preferably carried out using $InCl_3$, because of the latter's low solubility in organic solvents, as the initial product according to the first-mentioned embodiment, i.e. by working without a solvent. This statement does not apply to $InBr_3$, however.

If gallium (III) or indium (III) chloride is reacted without a solvent with an appropriate alkylhalide, it is advantageous for effecting a quick reaction process and a complete reaction of the employed metal halides, if the reaction process is carried out with reflux.

When applying the new methods, the alkyl halides or hydrogen halides may also be used in excess.

In accordance with the present invention, the gallium or indium iodides may also be produced from appropriate bromides which, at this time, is of no consequence in practical application since, up to now no useful technique other than the present invention, has been reported for producing the bromides which would be used as the initial products.

The gallium or indium halides produced according to the new method, are applicable best of all due to their purity and great reactivity in the production of highly pure semiconductor III–V compounds, such as gallium- and indium arsenides or gallium- and indium antimonides, from a gaseous phase. The aforementioned products are also excellent for doping semiconductor materials and for producing super conducting layers from intermetallic compounds of the gallium with niobium or vanadium.

For further illustrating the invention, the following examples are given.

Example 1

50 g. $GaCl_3$ are dissolved in approximately 250 ml. anhydrous benzene and reacted under agitation, at room temperature or boiling temperature, with stoichiometric amounts of ethyl iodide. HCl develops shortly thereafter, while well-developed, golden yellow, flaking crystals of $GaI_3$ are simultaneously precipitated. After the completion of the reaction, the crystals are filtered off in a moisture-proof vacuum system and dried. The yield may be increased by further working of the mother liquor. Yield: 110 g.=86% of theoretical; melting point: 211.8° C. (Literature: 212±1° C.)

Analyses.—Obtained: Ga, 15.46%; I, 84.51%. Calculated: Ga, 15.48%; I, 84.52%.

Example 2

50 g. $GaCl_3$ are dissolved in an excess, about 250 ml. of ethyl bromide. The solution is subsequently heated with reflux for a short period. The solvent is then distilled off. After a slight reduction of the reaction medium, $GaBr_3$ precipitates out as well-shaped, colorless, flaking crystals. The solvent is distilled off almost quantitatively and the product obtained is isolated in a moisture-proof filter system by being suctioned off and then dried. Yield: 80 g.=91% of theoretical; melting point: 121.3° C. (121.5±0.6° Literature.)

Analyses.—Obtained: Ga, 22.53%; I, 77.44%. Calculated: Ga, 22.54%; I, 77.46%.

Example 3

50 g. $InBr_3$ are dissolved in about 250 ml. anhydrous benzol. An appropriate amount, corresponding to the stoichiometric amount of anhydrous hydroiodic acid (HI), is introduced at room temperature, into the solution. Hydrogen bromide develops shortly thereafter, and at the same time, $InI_3$ is precipitated as well-developed, pale-yellow crystals. The product is separated from the reaction medium by being filtered off in a moisture-proof vacuum system and dried. Yield: 68 g.=97% of theoretical; melting point: 210° C. (212±2° Literature.)

Analyses.—Obtained: In, 23.16%; I, 76.84%. Calculated: In, 23.17%; I, 76.83%.

I claim:

1. A method of producing highly-pure halide compounds of gallium and indium of the general formula $$MeX_3$$

wherein Me is selected from gallium and indium and X is selected from bromine and iodine which comprises reacting a halide selected from the chlorides when X is bromine or iodine and bromides when X is iodine of trivalent gallium and trivalent indium with a halogen compound of the general formula RX', wherein R is selected from hydrogen and alkyl of from 1–5 C-atoms and X' is the same as X at a temperature between room temperature and the boiling temperature of the reaction mixture.

2. The method of claim 1, wherein the halide is selected from the chlorides of trivalent gallium and trivalent indium to produce the bromide.

3. The method of claim 1, wherein the halide is selected from the chlorides and bromides of trivalent gallium and trivalent indium to produce the iodide.

4. The method according to claim 1, wherein the reaction is carried out in the presence of an organic solvent.

5. The method according to claim 4, wherein benzene is the solvent.

6. The method of claim 4, wherein cyclohexane is the solvent.

References Cited

UNITED STATES PATENTS 2,904,397  9/1959  Nielsen _____ 23—87
3,278,258  10/1966  Tornquist _____ 23—87

OSCAR R. VERTIZ, Primary Examiner.

HOKE S. MILLER, Assistant Examiner.

U.S. Cl. X.R.

23—204